July 12, 1949.  H. J. MERTZ  2,476,059
DRIVE WHEEL ASSEMBLY

Filed Nov. 12, 1946　　　　　　　　　　　3 Sheets-Sheet 1

Inventor
HARRY J. MERTZ
By Carlsen & Hazle
Attorneys

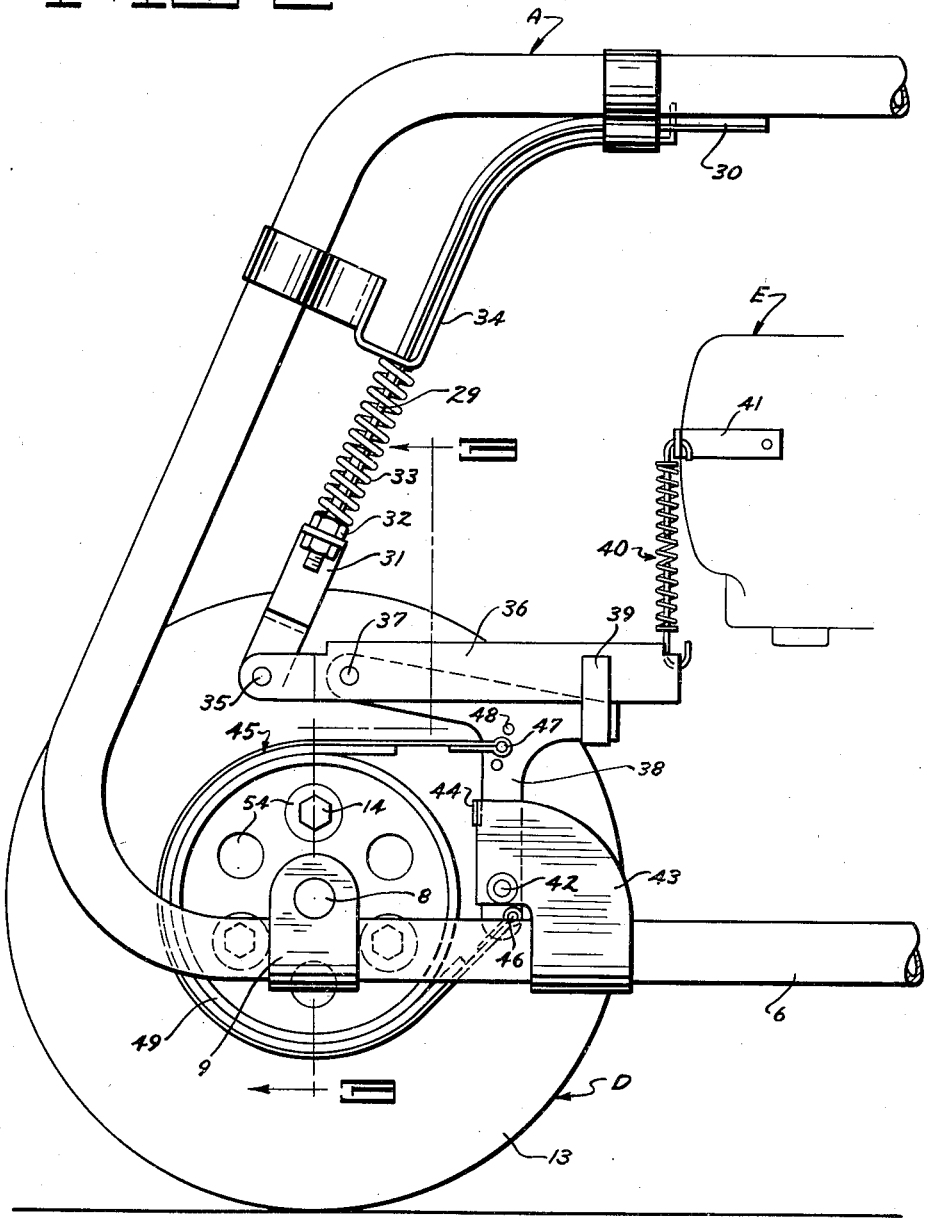

July 12, 1949. H. J. MERTZ 2,476,059
DRIVE WHEEL ASSEMBLY
Filed Nov. 12, 1946 3 Sheets-Sheet 3
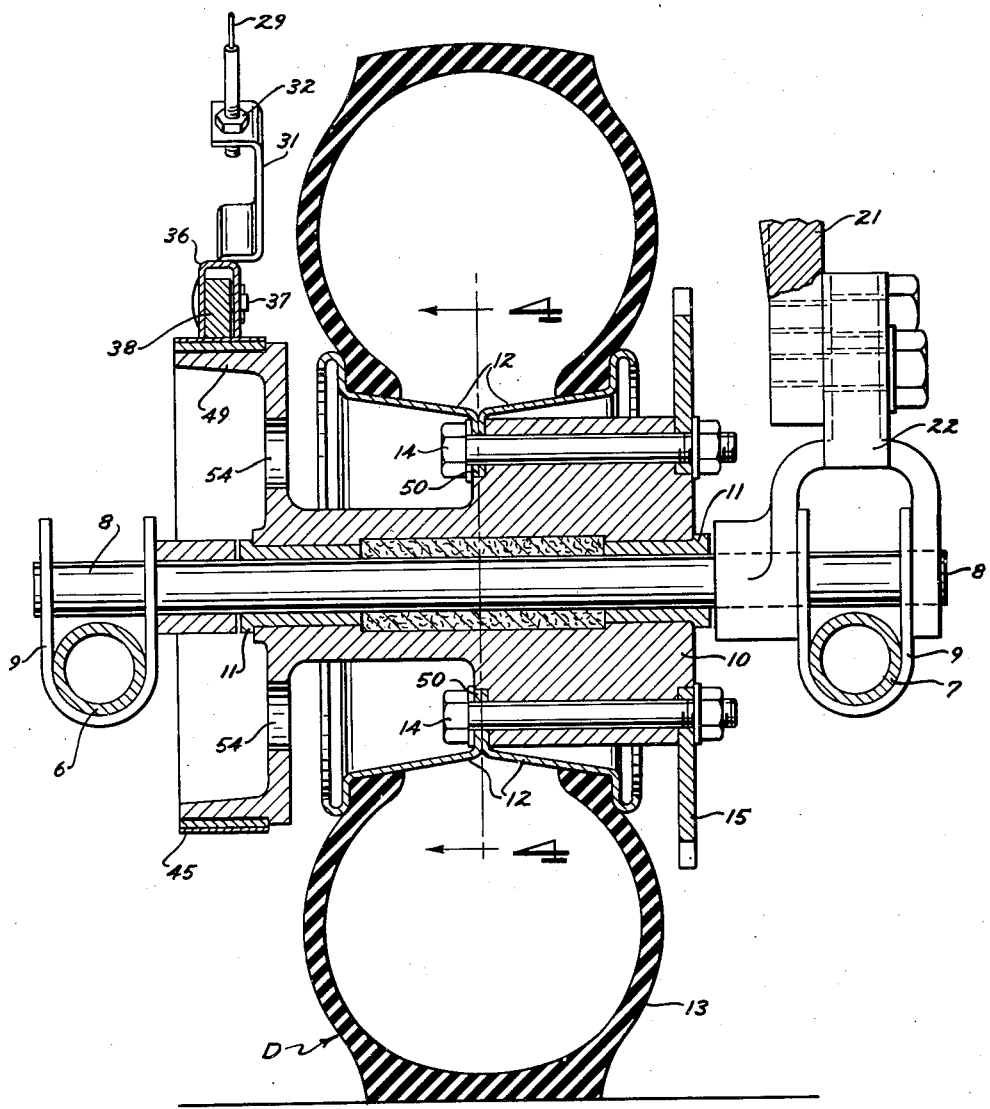
Inventor
HARRY J. MERTZ
By Carlsen & Hagle
Attorneys Patented July 12, 1949

2,476,059

UNITED STATES PATENT OFFICE 2,476,059

DRIVE WHEEL ASSEMBLY

Harry J. Mertz, Webster City, Iowa, assignor to Solar Corporation, Milwaukee, Wis., a corporation of Delaware Original application August 30, 1945, Serial No. 613,640. Divided and this application November 12, 1946, Serial No. 709,378

4 Claims. (Cl. 301—6)

This invention relates to drive wheel assemblies for motor vehicles of the so-called motor scooter type, and the primary object is to provide a drive wheel hub construction and associated parts that are particularly designed for rugged use and which can be easily and quickly removed for purpose of repair or changing of the tire.

The present application is a division of my copending application Serial No. 613,640, filed in the U. S. Patent Office on August 30, 1945, for Brake control and accelerator assembly.

In the accompanying drawings, which illustrate a preferred embodiment of the invention:

Fig. 2 is an enlarged detail elevation of the rear end of the scooter as seen from the right hand side thereof.

Fig. 3 is an enlarged sectional elevation on the irregular line 3—3 in Fig. 2.

Figure 1:
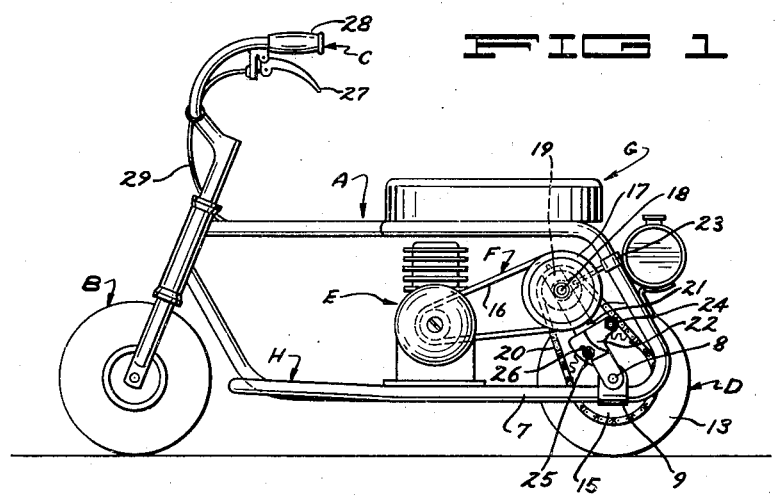
Fig. 1 is a left side elevation of motor scooter incorporating my improved drive wheel assembly.

Referring to the drawings more particularly and by reference characters, A designates the frame of a scooter vehicle, the same being supported on front wheel B steered by handle bars C, and by rear wheel D driven by engine E through suitable transmission mechanism F. The driver normally operates the machine sitting on seat G and with his feet resting on foot support H.

The frame A, preferably formed of tubular metal or pipe, is comparatively narrow at its forward portion, so as to best accommodate the driver, but the rear end is bifurcated and includes two rigidly connected frame bars 6—7 disposed in vertical parallel planes, and the upper parts of which support the seat G, while the lower parts support the motor or engine E.

The rear wheel D, is disposed between lower rear end portions of the bars 6—7, and is mounted on an axle 8 that is secured as by U-shaped clips 9.

The hub of the wheel D (see Figs. 3, 4 and 5) comprises a cast member 10, having bushings 11 surrounding the axle 8, and a pair of flanged collar or rim sections 12 which are so formed as to properly receive and support the tire 13. The members 12 are rigidly secured to the hub member 10 by bolts 14 which also serve to secure a sprocket gear 15 by which the wheel is rotated.

The transmission mechanism F includes a belt 16 connecting a pulley on the motor with a larger pulley 17 mounted rearwardly thereof on a shaft 18 which also carries a sprocket pinion 19 that drives a chain 20 passing about sprocket gear 15 to complete the drive connection.

The shaft 18 is journaled in the upper section 21 of a bracket 21—22 that fulcrums on the shaft 8, whereby the position of the pulley 17 may be adjusted to regulate the tension of belt 16. Such adjustment may be effected through an adjustable connection 23 with an upper part of frame bar 7 (Fig. 1). The two bracket sections 21 and 22 are pivotally connected at 24 and are adjustably secured with respect to each other by a bolt 25 secured in one section and operating in an arcuate slot 26 of the other section for the purpose of properly tensioning the drive chain 20.

Although not here disclosed it may be noted that the transmission mechanism preferably includes a fluid drive coupling, the same being mounted on the engine shaft for operating the pulley that drives the belt 16, as shown for instance in the Fields application, Serial No. 514,043 now matured into Patent No. 2,445,058 issued July 13, 1948.

In that type of drive it is unnecessary to entirely disengage the drive wheel D from the engine when stopping the vehicle, and consequently if the engine is decelerated and the rear wheel braked the vehicle may be stopped while still permitting the engine to run at idling speed. It has therefore been to considerable advantage to incorporate both the brake control and the carburetor or engine adjustment in the same control mechanism and in such manner that both may be actuated simultaneously by a single control member.

In the present instance the control member is a finger lever 27 and it is mounted adjacent one of the handles 28 of the handle bar C, in such manner that when it is squeezed toward the handle it will exert a pull on a flexible cable 29. This cable extends through a flexible conduit 30 to the rear of the machine where it attaches to a link 31, an adjustment 32 being provided between the cable and link. A spring 33, acting against a fixed bracket 34, tends to urge the link 31 downward, and, of course, the pull on cable 29 is against the tension of this spring.

The lower end of link 31 is pivoted, at 35, to one end of a straight lever 36, fulcrumed at 37, to one end of a generally T-shaped lever 38. The lever 36 is channeled, or U-shaped in cross-section (Fig. 3) to straddle the head end of lever 38, and, at the end opposite from fulcrum 38, is provided with a clip or strap 39 which engages under the corresponding end of lever 38. Strap 39 is of such length as to permit considerable tilting action of lever 36 with respect to lever 38.

At its forward extremity the lever 36 is connected by a push and pull spring device 40 to a gas control lever 41 of the engine, and operates in a manner more fully disclosed in my parent application.

Referring again to the T-lever 38, it is fulcrumed at point 42 in a bracket 43 rigidly secured on frame bar 6 and the rearward movement of this lever is limited by a lug 44 of the bracket. A brake band 45 is secured, at its opposite ends, to the brake lever, 38, as at points 46 and 47, the connection 47 being adustable, as at 48, to provide for wear adjustment of the brake lining. The brake drum 49, as best shown in Fig. 3, is an integrally cast extension of the wheel hub 10.

Figure 4:
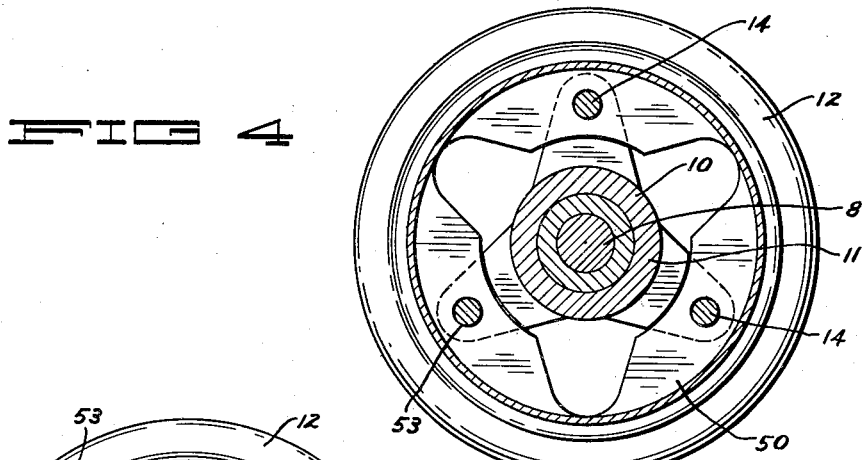
Fig. 4 is a sectional elevation on the line 4—4 in Fig. 3, showing the tire rim as bolted in place on the hub.
Figure 5:
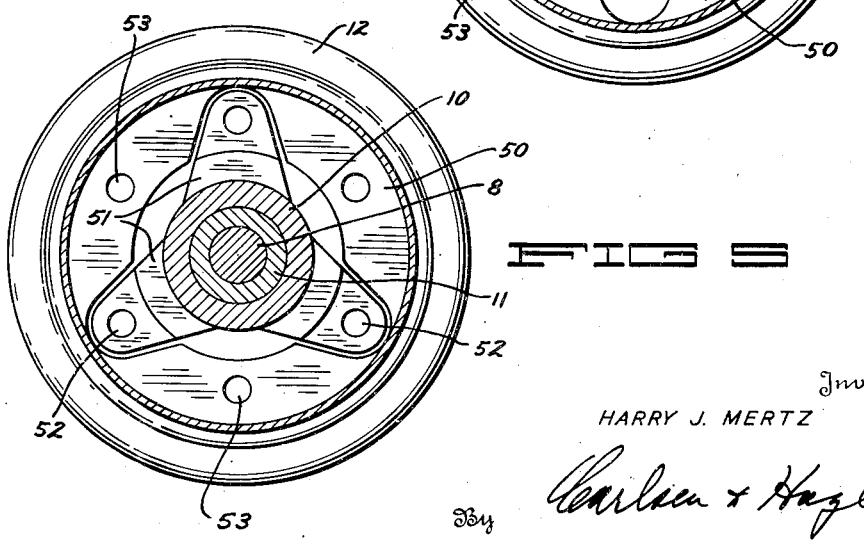
Fig. 5 is a sectional elevation similar to Fig. 4 but showing the rim bolts removed and with the rim members turned to a position where they may be axially separated and removed from the hub.

It is here to be noted that since the securing flanges 50 of the rim sections 12 are bolted, by 14, to the inner side of the hub 10 proper, and cannot be removed leftwardly as seen in Fig. 3, because of the integral drum section 49, provision must be made for their quick and convenient removal, and this is done as best illustrated in Figs. 4 and 5.

To this end the hub 10 is generally star-shaped in cross section, having radially and longitudinally extending lugs 51 which are bored at 52, to receive the bolts 14. Likewise, the rim flanges 50 are similarly sectioned, each corresponding section being bored, as at 53, to receive the bolts 14. The inner contour of the flange sections is such as to leave a star-shaped contour of the adjacent hub section. It will thus be seen that when the tire rim and hub are in the relative positions shown in Fig. 4 the bolts 14 can be inserted to rigidly secure the parts together. But when the rim is to be removed, as for instance to repair a tire, the operation is very simple. Thus removal of the bolts 14 releases both the gear 15 and the rim 12, whereupon it is a simple matter to rotate the rim with respect to the hub sufficiently so that the star-shaped opening will register with the hub lugs 51, as shown in Fig. 5, so that the rim can now be moved axially or to the right as viewed in Fig. 3. To facilitate removal and attachment of the bolts 14 wrench holes 54 are provided in the attaching web of the brake drum, as in Figs. 2 and 3.

It will of course be understood that various modifications may be made in the structure as herein illustrated and described without departing from the spirit and scope of the appended claims. Having now therefore fully illustrated and described by invention what I claim to be new and desire to protect by Letters Patent is:

1. A drive wheel assembly for a motor vehicle comprising a hub having an integral brake drum extending at one end therefrom and having a sprocket wheel disposed at the other end thereof, a tire rim disposed peripherally about the hub, and bolts extending longitudinally through the hub to secure both the sprocket wheel and rim thereto.

2. A drive wheel assembly for a motor vehicle comprising a hub having an integral brake drum extending at one end therefrom and having a sprocket wheel disposed at the other end thereof, a tire rim disposed peripherally about the hub, and bolts extending longitudinally through the hub to secure both the sprocket wheel and rim thereto, said rim having two sections with adjoining flanges through which said bolts extend.

3. In a drive wheel assembly, a hub having an integral brake drum at one end and a removable drive gear at the other end, a wheel rim mounted against an end surface of the hub facing the drum, bolts extending through the wheel rim, drive gear, and a portion of the hub to secure them rigidly together, said hub portion and a center opening in said wheel rim being so shaped that when the bolts are removed and the rim is rotated into offset position with respect to its normal position of attachment to the hub the rim may be removed axially over said hub portion in the direction of the drive gear end thereof.

4. In a wheel assembly, a hub having longitudinally extending peripheral recesses over a portion thereof and a brake drum integrally connected to the said hub portion by a relatively reduced sleeve part, a tire supporting rim releasably attached to the end surface of said hub portion adjacent said sleeve part, said rim having attaching flange members adapted to move through the recesses when the rim is rotated to offset position with respect to its normal position of attachment to permit removal of the rim lengthwise over the recessed portion of the hub.

HARRY J. MERTZ.

REFERENCES CITED

The following references are of record in the file of this patent:

UNITED STATES PATENTS

| Number | Name | Date |
|---|---|---|
| 788,840 | Madden et al. | May 2, 1905 |
| 1,071,000 | Vandegrift | Aug. 19, 1913 |
| 1,740,738 | Keith | Dec. 24, 1929 |
| 2,151,615 | Potter | Mar. 21, 1939 |
| 2,165,723 | North | July 11, 1939 |